Feb. 3, 1931.  W. A. KLINE  1,791,214
INNER TUBE FOR PNEUMATIC TIRES
Original Filed Nov. 5, 1929

INVENTOR
Walter A. Kline.
ATTORNEY

Patented Feb. 3, 1931

1,791,214

UNITED STATES PATENT OFFICE

WALTER A. KLINE, OF MIDDLETOWN, ILLINOIS, ASSIGNOR TO THE A-R PRODUCTS CORPORATION, OF AKRON, OHIO, A CORPORATION OF OHIO

INNER TUBE FOR PNEUMATIC TIRES

Original application filed November 5, 1929, Serial No. 405,028, and in Canada January 11, 1930. Divided and this application filed July 28, 1930. Serial No. 471,233.

My present invention relates to the art of pneumatic tires and it particularly has reference to the inner tubes of such tires.

Recently drop center rims have come largely into use and it has been found that, due to low inflation pressures or when punctures occur, the inner tubes are frequently "chewed up" before the driver becomes aware that he has a flat tire. This is due in large measure to the pinching of the inner tube between the beads of the shoe or between the beads and the rim. When tires on drop center rims become under-inflated they have a decided tendency to creep around the rim and also laterally, thereby frequently injuring the inner tube as well as causing the heating of the tire.

My invention, therefore, has for its objects to provide an inner tube which will, after inflation, attach itself to the rim and to the beads of the tire shoes in such a manner as to connect beads to rim by elastic joints which, however, will be of sufficient tenacity to prevent creeping of the shoe on the rim and in event of sudden deflation will tend to hold the beads of the shoe against the rim flanges and keep them from working into the rim well to the injury of the tube.

Other objects will in part be obvious and in part be pointed out hereinafter.

To the attainment of the aforesaid objects and ends, my invention consists in the novel features of construction and in the combination, connection and arrangement of parts, hereinafter more fully described, and then pointed out in the appended claims.

In the drawings:

Figure 4 is a detail cross section of a modification hereinafter referred to.

Figure 1:
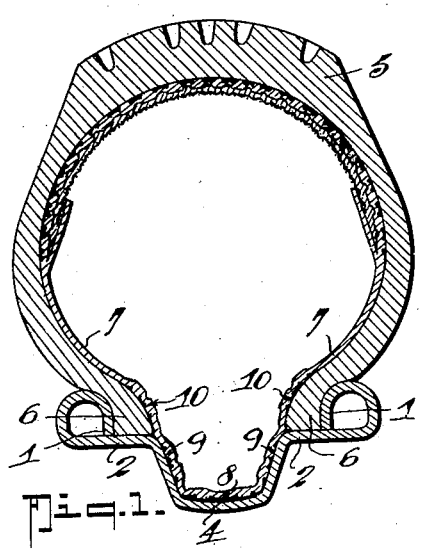
Figure 1 is a cross section of a drop center rim with tire and tube applied and inflated.

In carrying out my invention I provide the tube, 7, which has along its inner periphery, one or more rows of suction or vacuum cups 8 to engage the rim strip 4 which is cemented within the bottom of the rim well 3. The strip 4 is provided to cover the spoke ends and any irregularity caused by the attachment of the spokes to the rim. The tube 7 also has a row of suction cups 9 at each side of the central set 8 for the purpose of engaging the side walls of the well 3 of the rim, a third set of vacuum cups 10 being provided to engage the beads 6 of the shoe 5, which beads rest on narrow bead seats 2 of the rim and lie against the flanges thereof.

Figure 2:
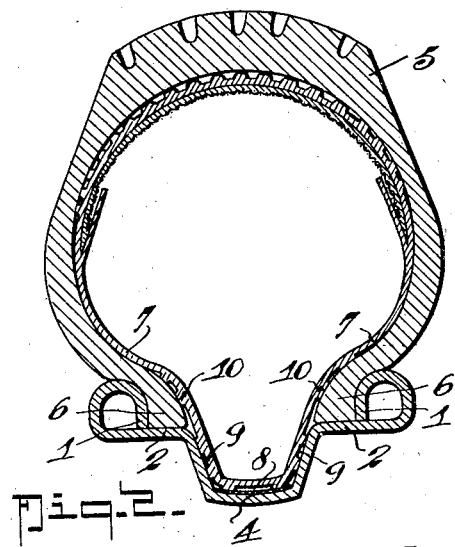
Figure 2 is a view similar to Figure 1 after the tube has been deflated.

As will be noticed by reference to Figures 1 and 2, after the tube has once been inflated and the suction cups 8, 9 and 10 have taken hold, the beads 6 of the shoe will be tied to the rim by flexible elastic connections that will have sufficient tenacity, however to hold the beads separated laterally (i. e., hold them against the flanges 1) and prevent their working over into the well of the rim. In this way the cutting of the tube by pinching it between the shoe beads or between the beads and the rim which is now so common with ordinary inner tubes, is avoided and the driver will have ample time to draw out of the traffic lane and stop his car before the vacuum cups let go.

By providing the tube with the means for connecting the beads and rim together, should a sudden drop in pressure occur within the tube (as might be caused by a blow-out or a large gash cut) such drop in pressure will simply cause the suction cups to hold tighter and thus give the driver ample time to get out of the traffic stream to the side of the road where he can change tires conveniently or repair the damaged one.

Even should the beads of a deflated tire work toward one another somewhat, as might occur if considerable side thrust is placed on the tire, there will be little danger of damaging the rim face of the inner tube since the tube will stretch and accommodate itself to such movement of the beads and when the thrust is relieved will tend to restore the beads to their normal positions on the rim.

Furthermore, it will be obvious that by connecting the beads to the rim through the medium of elastic flexible strips as it were, the likelihood of the shoe creeping around the rim (as it sometimes does with the tubes now generally used) when partially deflated is reduced to a minimum.

Figure 4:
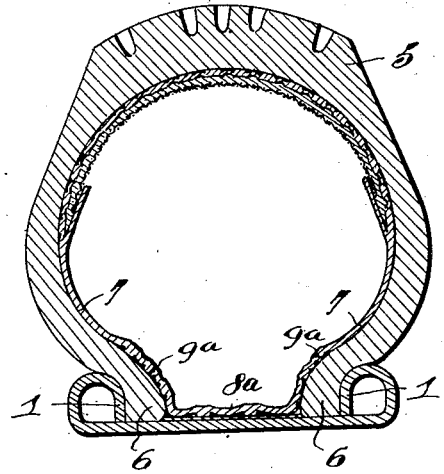
Figure 3:
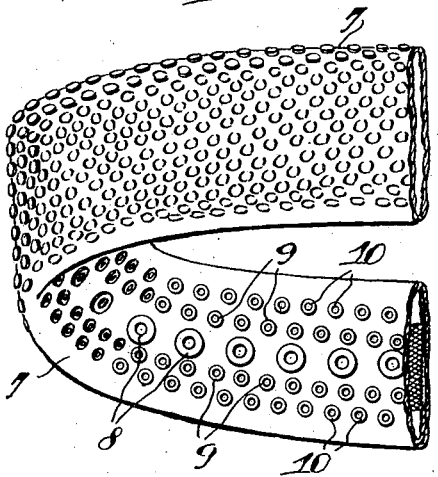
Figure 3 is a detail perspective view of a portion of an inner tube with my invention applied thereto.

While my tube is especially adapted to use with drop center rims, it may also be employed with the ordinary flat type rim, in which event the vacuum cups would be arranged in three groups, the center group 8a engaging the rim and the two side groups 9a engaging the beads of the shoe 6, Figure 4.

This application is a division of my application, Ser. No. 405,028, filed Nov. 5, 1929, patented September 2, 1930, No. 1,774,892.

From the foregoing description, taken in connection with the accompanying drawings, it is thought the construction, uses and advantages of my invention will be clear to those skilled in the art to which it relates.

What I claim is:

1. In combination with a rim and a tire shoe thereon having beads, said rim having bead seats, of an inner tube having that portion which engages the beads and rim of approximately uniform thickness in cross section and provided with means to secure said beads in place on said rim.

2. In combination with a rim and a tire shoe thereon having beads, said rim having bead seats, of an inner tube and means to cause an adhesion of the inner tube to the beads and rim for the purpose described.

3. In combination with a rim and a tire shoe thereon having beads, said rim having bead seats, of an inner tube, said inner tube having suction cups arranged to engage with said beads and with said rim.

4. In combination with a drop center rim and a tire shoe thereon having beads, said rim having bead seats and a well, of an inner tube, said inner tube having suction cups to engage said beads and having other suction cups to engage the rim within the well thereof.

WALTER A. KLINE.